United States Patent

[11] 3,598,306

| [72] | Inventor | Thomas Lawrence Osborne |
| | | 5 Spring Valley Drive, Holmdel, N.J. 07733 |
| [21] | Appl. No. | 7,461 |
| [22] | Filed | Feb. 2, 1970 |
| [45] | Patented | Aug. 10, 1971 |

[54] TIME-SPEED-DISTANCE COMPUTER INSTRUMENT
10 Claims, 2 Drawing Figs.

[52] U.S. Cl. .................................................. 235/61 NV, 58/152 E
[51] Int. Cl. .................................................. G04b 37/12, G06c 3/00
[50] Field of Search ........................................ 235/61 NV, 61 B, 78, 88, 70; 58/152 C, 152 E, 152 F, 126 D, 127

[56] References Cited
UNITED STATES PATENTS

| 1,382,011 | 6/1921 | O'Neill et al. ................ | 235/70 |
| 1,475,999 | 12/1923 | Jaray ............................ | 235/70 |
| 3,023,954 | 3/1962 | Gurney et al. ............... | 235/61 X |
| 3,127,102 | 3/1964 | Fallis ........................... | 235/61 |
| 3,282,501 | 11/1966 | Copeland ..................... | 235/61 X |
| 3,315,887 | 4/1967 | Martin, Jr. ................... | 235/61 |

FOREIGN PATENTS

| 914,729 | 6/1946 | France ......................... | 235/61 |

Primary Examiner—Richard B. Wilkinson
Assistant Examiner—Stanley A. Wal

ABSTRACT: A time-speed-distance computer instrument is described which uses coupled logarithmic and linear scales and a continuously indicating clock mechanism to allow computation of travel time, estimated time of arrival, actual time of arrival, speed, elapsed time, distance traveled, current time, and other associated quantities, without reference to any other instrument or use of mental arithmetic, and without restriction on the magnitude of the variables.

TIME-SPEED-DISTANCE COMPUTER INSTRUMENT

BACKGROUND OF THE INVENTION

This invention relates to computer instruments and more particularly to a computer instrument for use in mobile vehicles for rapidly and accurately computing the various required time, speed, and distance quantities without reference to any other instruments.

In many situations it is necessary to calculate one of the three variables, time, speed, or distance, from the other two, rapidly, efficiently, and repetitively. An example, for which the calculator described here was specifically designed, is an aircraft flying under instrument flight rules (IFR). Under IFR conditions, the pilot must tell a ground controller when he is over a designated point on the ground and the time at which he will be over the next designated point. Since the aircraft may be traveling at speeds exceeding 2 miles a minute, the pilot has very little time to perform calculations; yet he must maintain the proper altitude and direction at the same time. Thus the speed and efficiency of the calculation are critical to the safe operation of the aircraft in such conditions.

A brief outline of the steps involved in position reporting will help in understanding the operation of the calculator to be described. These steps are almost essential in IFR flight and are considered good practice and commonly used in any flight. Let it be assumed that the aircraft is over point B and that the pilot has an estimate of the ground speed from the time previously required to cover the distance from point A to point B. The distances, $D_{ab}$, $D_{bc}$, etc., between all reporting points are assumed known from the preflight calculations. At or as near as possible to point B the pilot must report to the ground controller that he was over point B at time $T_b$ and that his estimated time of arrival (ETA) over point C is time $T_c$. Times are reported in minutes after the hour. A typical sequence of events is as follows: (1) Arrival at point B is indicated by a radio navigation instrument; the pilot writes down the time, $T_b$. (2) Using a circular slide rule calculator, he calculates the estimated number of minutes, $M_{bc}$, required to cover the distance to point C, $D_{bc}$, at a ground speed, $S_{ab}$, estimated from the previous leg of the flight. (3) He adds the number of minutes calculated, $M_{bc}$, to the time, $T_b$, he arrived over point B, and arrives at his ETA, $T_c$, over point C. He then reports $T_b$ and $T_c$ to the ground controller. On arrival over point C the pilot must repeat these three steps, but in addition he must first recalculate his ground speed from point B to point C based on his actual time of arrival (ATA) over point C. To do this he (4) notes the actual time of arrival over point C, $T_c'$, and (5) subtracts $T_b$ from $T_c'$ getting the actual number of minutes required to cover the distance $D_{bc}$, (6) Using the slide rule calculator he calculates his actual ground speed from point B to point C. He then repeats steps (1) to (3). This sequence is repeated at every check point as the flight progresses.

In step (1) the pilot refers to a clock or watch and writes down the time. In step (2) he uses both hands to manipulate a slide rule-type device. In step (3) he sometimes can perform the addition mentally if the numbers are not large but for best accuracy, and to avoid forgetting, the operation is performed with a pencil. Similar procedures are used for steps (4), (5), and (6).

The many steps—looking at watch, writing with pencil, calculating with slide rule, adding mentally,—are extremely taxing to the manual and mental ability of a single pilot especially in turbulent conditions. The practical embodiment of the time-speed-distance calculator to be described was designed to substantially reduce the number of operations required and the number of instruments involved and eliminate the need for written numbers in the calculations just described.

In the prior art are several instruments which perform the calculations of steps (2), (5), and (6). For example, one displays the estimated number of minutes, $M_{bc}$, required to cover the distance $D_{bc}$ and then continually displays the number of minutes left until point C is crossed and also displays the distance traveled since crossing point B. Upon crossing point C the resolution of the indicated distance traveled with the actual known distance between points B and C results in the display of the actual ground speed $S_{bc}$, whereupon the next time calculation can be made. However, the use of a clock and some mental or manual calculation are still required to accomplish steps (1), (3) and (4). In addition, individual models of these instruments are limited to particular speed ranges.

SUMMARY OF THE INVENTION

It is therefore an object of this invention to provide an instrument which is capable of performing all the steps, (1) through (6), without the use of any other instruments and without any mental or manual calculations.

It is a further object of this invention to provide a single instrument which has no limitation on the speed range with which it can be used and is therefore applicable to any situation where such calculations are required.

In accordance with the invention a clock mechanism provides correct time information continuously and also drives a moving linear time scale which indicates the number of minutes required to travel between check points. The linear time scales are associated by means of a set of lines with a movable logarithmic distance scale. The division or multiplication required in the solution of the time-speed-distance formula is accomplished by means of the logarithmic scale; the addition or subtraction of times by the linear time scales. The linear time scales are eccentrically located relative to the logarithmic scales in such a way as to make the scales more readable than they would otherwise be. The use of a two-cycle logarithmic scale also gives the clearest arrangement of the scales and provides a directly indicated speed range of two decades. In the practical embodiment shown, a movable index marks a point on the logarithmic distance scale so that quantities relative to this distance are easily found.

DETAILED DESCRIPTION

Figure 1:
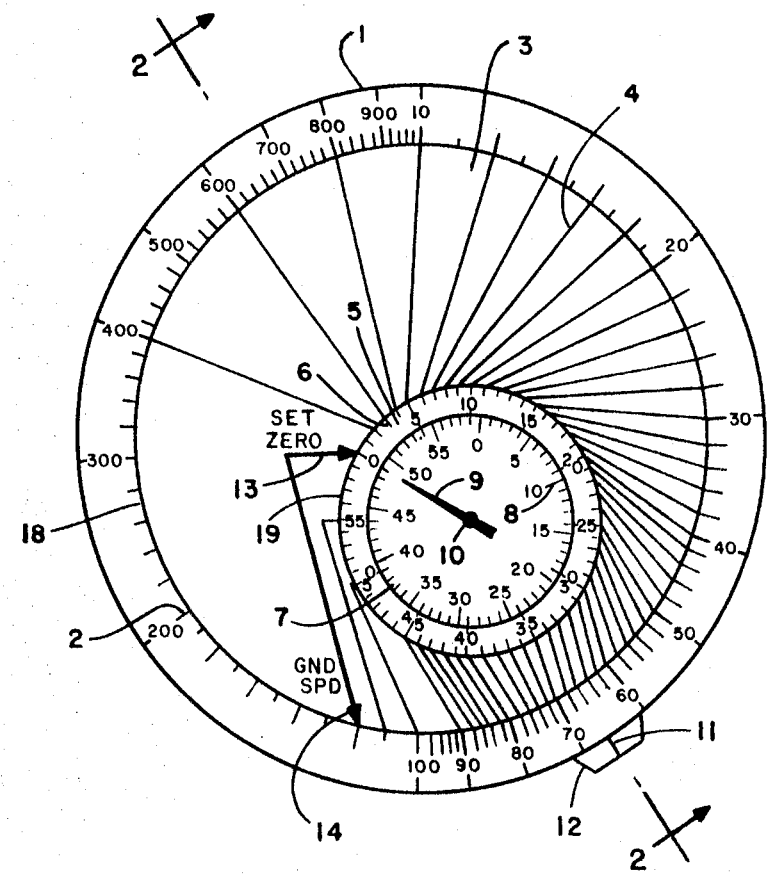
FIG. 1 is a top view of the invention showing the various scales and their relative arrangements.

Referring to FIG. 1, there is shown a faceplate 3 with a circular outer edge 18 and a circular hole 19 located eccentrically and within the outer edge 18. The faceplate 3 has a set of nonintersecting lines 4 extending from the outer edge 18 to the edge of the hole 19. The outer ends of the lines 4 are spaced logarithmically around the outer edge 18 and linearly around the edge of hole 19. An outer annular scale card 1 is located concentric with and adjacent to the outer edge 18 of the face plate 3. The scale card 1 has a logarithmic scale 2 with two logarithmic cycles and numerals from 10 to 1000. The numerals can represent any number by imagining a decimal point properly located. The logarithmic scale 2 has the same scale factor as the outer ends of lines 4 making the scales compatible. Tab ring 12 is rotatably mounted adjacent to scale card 1 and has a distance index 11 for marking a distance on scale 2.

Still referring to FIG. 1 there is shown an annular inner scale card 5 concentric and adjacent to the edge of hole 19 and located within hole 19. Scale card 5 has a linear scale 6 with a calibrations from 0 to 59. Associated and moving with scale card 5 is a pointer indicator 9 and both scale card 5 and pointer indicator 9 are attached rigidly to and driven by shaft 10. Located within and adjacent to scale 6 is a second linear time scale 8 located on the face 7 of the clock mechanism. Time scale 8 has calibrations from 0 to 59 and the time divisions on scales 6 and 8 have the same scale factor as the inner ends of lines 4. Scale card 1 is rotatable with respect to faceplate 3; linear scale 8 is rotatable with respect to faceplate 3, and linear scale 6 and pointer indicator 9 are rotatably driven by the shaft 10 with respect to scale 8 and thereby with respect to faceplate 3. Located on faceplate 3 and actually one of the set of lines 4 is a "set zero" index 13 and a "ground speed" index 14. The operation of the invention will be described in detail referring to the parts shown in FIG. 1 after a discussion of the mechanical arrangement used for allowing the relative movements of the scales just described.

Figure 2:
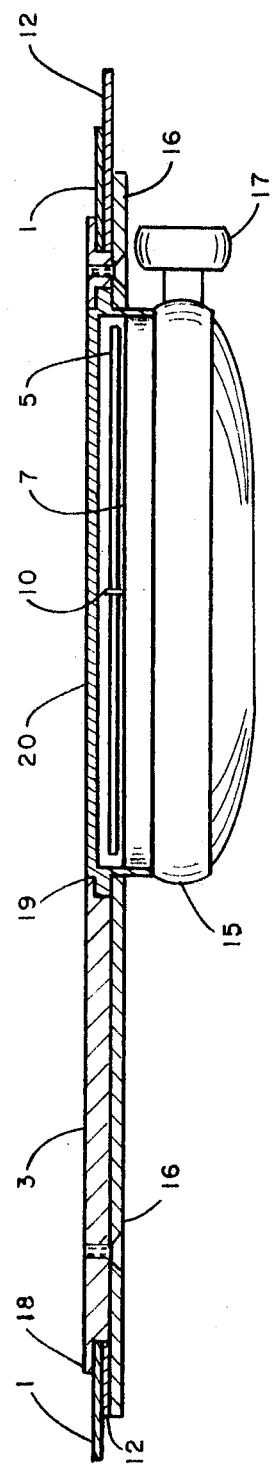
FIG. 2 is a cross section also showing the mechanical construction and in particular the scale mounting and the provisions for rotating the clock mechanism.

FIG. 2 shows a cross section as indicated on FIG. 1. Referring to FIG. 2, faceplate 3 has recessed edges on the underside into which fit scale card 1 and tab ring 12 on the outside edge, and a transparent cover 20 at the inner edge of hole 19. The cover 20 is rigidly attached to clock mechanism 15 which drives shaft 10. Lower plate 16 extends past the recessed edges of faceplate 3 and is rigidly attached to faceplate 3 thereby retaining scale card 1, tab ring 12, and cover 20 in place. Scale card 5 is a transparent disk with scale 6 located around the outer edge and pointer indicator 9 extending radially outward from shaft 10. Scale card 5 is rigidly attached to shaft 10 which is driven by clock mechanism 15. The clock mechanism 15 has a stem 17 for winding and setting the pointer indicator 9 to the current time on scale 8. Scale 8 is imprinted on the face 7 of clock mechanism 15.

Referring again to FIG. 1, the operation of the invention will now be described in the context of the IFR aircraft flight previously discussed. It should be understood that this example is used for simplicity and clarity of explanation of the invention and that the invention has much broader applications such as in certain types of sports car rallying.

At a convenient time prior to the flight, the pilot sets the pointer indicator 9 to the current time in minutes after the hour as indicated on scale 8. For the remainder of the discussion it will be assumed that pointer indicator 9 indicates on scale 8 the correct current time in minutes after the hour.

Assuming the plane is approaching point B, it will now be demonstrated how steps (1), (2), and (3) of the previous example are accomplished solely by reference to the invention. The pilot first estimates his ground speed $S_{bc}$ at say 120 m.p.h. and moves scale 2 so that 120 m.p.h. is adjacent to the "ground speed" index 14. Upon crossing point B the entire clock mechanism (including scales 6 and 8) is rotated so that pointer indicator 9 and zero on scale 6 are adjacent to "set zero" index 13. The pointer indicator 9 in conjunction with scale 8 indicates that the time, $T_b$, of the crossing of point B is 49 minutes after the hour. Distance index 11 is moved to the number corresponding to the distance $D_{bc}$, say 50 miles. Following the one line of the set of lines 4 which is located nearest the distance $D_{bc}$ on scale 2 to its terminus at scales 6 and 8, the time required to travel the distance $D_{bc}$ at speed $S_{bc}$ is indicated on scale 6 as 25 minutes. At that same point on scale 8 is indicated the estimated time of arrival, $T_c$, at point C of 14 minutes after the hour. Steps (1), (2), and (3) will have been accomplished with reference to one instrument and with only two manipulations required.

Between points B and C, the invention provides the following useful information. Scale 6, read opposite distance index 11 continuously displays the number of minutes remaining until point C is crossed. Scale 6, read at the "set zero" index 13, with a mental subtraction (a reversed scale could be added to indicate this quantity directly) continuously displays the number of miles traveled from point B and, by a mental subtraction from the number under distance index 11, scale 2 indicates the number of miles remaining to point C.

Assuming arrival over point C it will now be demonstrated how the actual ground speed is determined, accomplishing steps (4), (5), and (6) of the previous example. To illustrate, assume that on arrival at point C the time is 9 minutes after the hour as indicated on scale 8 by pointer indicator 9. Since the distance is known to have been 50 miles, scale 2 and index 11 are rotated to be opposite the pointer indicator 9. The actual ground speed is then displayed under the "ground speed" index 14. By rotating the entire clock mechanism 10 so that the pointer indicator 9 and zero on scale 6 are adjacent to the "set zero" index 13, and setting the distance index 11 to the distance of the next point, the ATA for point C and ETA for the next point are displayed as before using the corrected ground speed.

One basic principle used by this invention is a unique property of two adjacent logarithmic scales; that is, the ratio of a number on one logarithmic scale to the adjacent number on the other logarithmic scale is the same for all adjacent pairs of numbers on the two scales. For example, if $D_1$ is a distance on logarithmic scale A the the time $T_1$ is the adjacent number on logarithmic scale B, then $D_1/T_1 = D/T$ for all other pairs of adjacent numbers, $D$ and $T$. Since $D_1/T_1$ is a distance per unit time it equals a speed S. Referring to FIG. 1, if the desired speed S, say 120 m.p.h., is set opposite the "ground speed" index 14, the ratio 120 miles per 60 minutes or 120 m.p.h. is established for all other pairs of numbers on scale 2 and on scale 6 which is associated with scale 2 by the set of lines 4. Once the ratio is established the time $T$ required to travel any distance $D$ is indicated on scale 6 opposite the distance $D$ on scale 2. Since the logarithmic scale can represent any number, any speed can be used. This computer differs from the prior art in time-speed-distance computers in that it uses the logarithmic principle whereas the prior art has used sets of mechanically indicated graphical and tabular solutions of the time-speed-distance equations, resulting in limited speed ranges. A second basic principle used in this invention is the transformation of a set of linearly displaced numbers into a logarithmic displacement by a set of lines, the set of lines 4. As a result of the transforming set of lines 4, the time quantities computed on the logarithmic scales are displayed on a linear scale, thus allowing addition and subtraction of time quantities by use of linear scales 6 and 8. The unique association of logarithmic and linear scales by the transforming lines 4 allows all four operations—multiplication, division, addition, and subtraction—required in the complete solution of steps (1) through (6) of the previous example to be accomplished by this one computer instrument.

I claim:
1. A computer instrument comprising:
   a faceplate,
   index means on said faceplate,
   a first scale card forming a first common boundary with said faceplate,
   a first scale on said first card arranged logarithmically along the first common boundary,
   a second scale card forming a second common boundary with said faceplate, but not intersecting said first common boundary,
   a second scale on said second card arranged linearly along the second common boundary, with calibrations increasing from zero,
   support means for adjustable positioning said first and second scale cards with respect to said faceplate,
   and a set of nonintersecting lines on said faceplate extending generally from the first common boundary to the second common boundary with the first termini of said set of lines arranged logarithmically along the first common boundary with the same period of logarithmic variation as said first scale, and with the second termini of said set of lines arranged linearly along the second common boundary with the same linear increment as said second scale thereby associating selected points on said first scale with corresponding points on said second scale, said set of lines so arranged that when the zero calibration mark of said second scale is aligned with said index means on said faceplate then the ratio of the values at the associated points on said first and second scales is the same for every set of associated points,
   a third scale card forming a third common boundary with said second scale card, but not intersection with second common boundary, a third scale on said third scale card arranged linearly along said third common boundary, with calibrations increasing from zero and having the same linear increment as said second scale, said third scale being successively registerable with respect to said second scale, and second support means for positioning said third scale relative to said second scale.

2. A computer instrument as in claim 1 wherein said first, second, and third scale cards are circular thereby forming closed and continuous first, second, and third common boundaries, and wherein said support means allows continuous rotation of each scale relative to the other.

3. A computer instrument as in claim 2 wherein the second and third common boundaries of said faceplate and second and third scale cards are concentric but are eccentric with respect to the first common boundary of said faceplate and said first scale card.

4. A computer instrument as in claim 2 wherein said first scale on said first scale card has two cycles of logarithmic variation.

5. A computer instrument as in claim 2 wherein said support means includes a driving means for driving said second scale card at a linear rate with respect to the quantity indicated by said second scale.

6. A computer instrument as in claim 2 in which said first scale represents distance and said second and third scales represent time.

7. A computer instrument as in claim 3 wherein said first scale has two logarithmic cycles and represents quantities of distance, said second scale represents time, said driving means is a clock mechanism thereby driving said second scale card at a linear rate with time relative to said faceplate and said third scale card, said second scale includes pointer means pointing radially outward from the center of said second scale toward said second scale thereby indicating a time quantity on said third scale, said third set of lines includes index means associating a given distance on said first scale with a given time on said second scale thereby defining a ratio of distance to time which is a speed, said set of lines on said faceplate mutually connects pairs of distances and times on said first and second scales which have equal ratios, said computer instrument includes a distance index card adjustably mounted adjacent to said first scale card and bearing thereon an index for indicating a distance on said first scale.

8. A computer instrument comprising:

a flat faceplate with a circular outer edge and a circular inner edge, the outer and inner edges being recessed on the underside of said faceplate, a set of nonintersecting lines on said faceplate, the outer termini of said lines being spaced logarithmically along said outer edge and the inner termini of said graph lines being spaced linearly along said inner edge, a flat annular scale card rotatably mounted in the recess of the outer edge of said faceplate, a distance scale on said first scale card with indicia spaced logarithmically around said first scale card in juxtaposition with said outer termini of said lines of said faceplate, a flat annular index card rotatably mounted in the recess of the outer edge of said faceplate, said index card bearing thereon means for indicating a point on said scale card and being in frictional contact with said scale card, a clock mechanism including a shaft which rotates at a linear time rate when the clock mechanism is actuated, a first linear time scale on the top face of the clock mechanism, a flat circular disk rigidly attached to the shaft of said clock mechanism, said disk being transparent thereby allowing said first time scale to be seen, a second linear time scale around the outer perimeter of said disk with the inner boundary of said second scale lying in juxtaposition with the outer perimeter of said first time scale, an indicator line on said disk extending radially outward from the shaft to a position near said first time scale, a circular cylindrical transparent cover positioned above said disk and rigidly attached to said clock mechanism, said cover having a flange around the outside of said cover, the flange rotatably fitting in the recess in the inner edge of said faceplate, a lower plate attached rigidly to said faceplate and extending past the outer and inner recessed edges of said faceplate thereby retaining said scale card and said index card in the recess in the outer edge of said faceplate and retaining the cover flange in the recess in the inner edge of said faceplate.

9. A computer instrument as in claim 8 wherein the circular inner edge of said faceplate is eccentrically located with respect to the outer edge and wholly contained therein.

10. A computer instrument as in claim 8 wherein said distance scale contains two logarithmic cycles of variation, said lines on said faceplate include an index line associating a given distance on said distance scale with a given time on said second time scale thereby defining a ratio of distance to time and a speed.